March 18, 1930.   E. DAVIS   1,751,445
PISTON CONSTRUCTION
Original Filed March 31, 1927
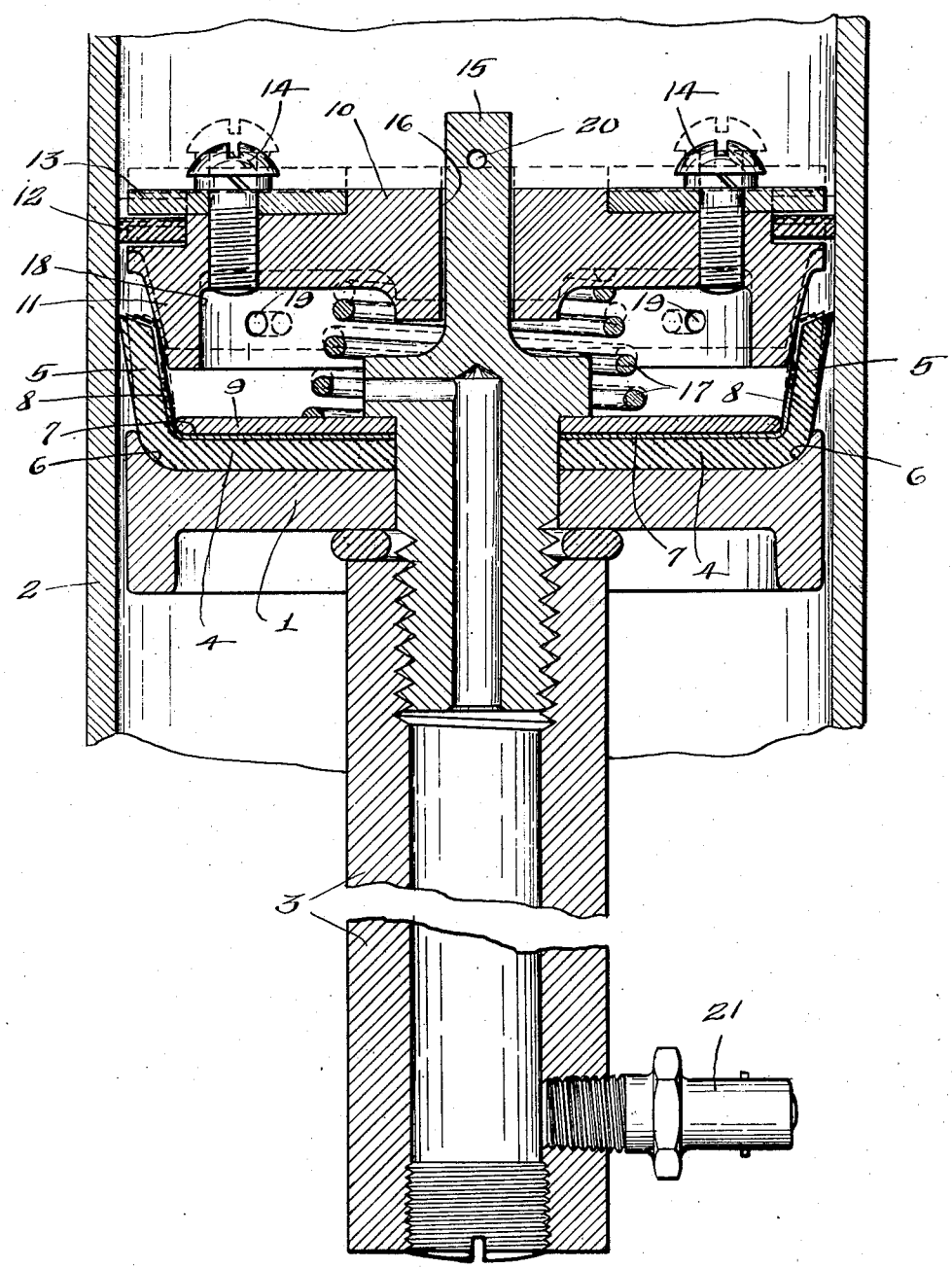
INVENTOR.
Ernest Davis
BY Parsons & Bodell
ATTORNEYS.

Patented Mar. 18, 1930

1,751,445

UNITED STATES PATENT OFFICE

ERNEST DAVIS, OF SYRACUSE, NEW YORK, ASSIGNOR TO THE PROSPERITY COMPANY INC., OF SYRACUSE, NEW YORK, A CORPORATION OF NEW YORK

PISTON CONSTRUCTION

Application filed March 31, 1927, Serial No. 179,994. Renewed August 9, 1929.

This invention has for its object a single acting piston or plunger construction by means of which a tight joint is maintained between the piston and the cylinder wall during the power stroke of the piston.

The invention consists in the novel features and in the combinations and constructions hereinafter set forth and claimed.

In describing this invention reference is had to the accompanying drawing which is an enlarged vertical sectional view of a piston embodying my invention.

This piston construction comprises generally a head having a packing which is cup-shaped or provided with an annular wall for engaging the cylinder wall, and pressure operated means acting to mechanically expand the packing into engagement with the cylinder wall during the power stroke of the piston.

1 designates the piston head movable in the cylinder 2, the head being mounted upon a suitable rod 3 connected to the part to be actuated or in case of a pump piston to the actuating part.

4 is a cup-shaped packing of resilient material as leather, or a rubber composition, this packing having its annular wall 5 engaging the cylinder wall. The packing is seated in a countersunk recess 6 in the piston head 1, and is held in position by a plate 7 overlying the disk portion of the packing, that is the packing in the recess 6, the plate 7 having an annular flange 8 at its rim for engaging the base portion of the portion 5 of the packing; this flange 8 is opposite to the outer wall of the recess 6 and cooperates therewith to form the angle in the packing between its annular wall 5, and its discoidal portion 4.

A plate 9 overlies the disk 7, and is held in position as will be hereinafter set forth. The means for expanding the portion 5 of the packing into engagement with the cylinder wall during the power stroke of the piston comprises a second head 10 movable toward and from the first head and having means as a conical portion 11 extending into the cup-shaped packing 5 to engage and expand the same into snug engagement with the cylinder wall. The head 10 has a ring 12 for engaging the cylinder wall for centering the head 10, the ring being held in position by a plate or flat ring 13 which is secured to the head 10 by screws 14. The head is mounted upon a stem 15, which is an extension of the rod 3, and this extension or stem 15 loosely fits the passage 16 in the head 10. A spring 17 is interposed between the two heads as at 10, and tends to separate the heads and also to hold the disk 9 in position. The head 10 is formed with a recess 18 on its inner face, and this recess together with the space enclosed by the cup-shaped packing 5 forms the air chamber, and in order that the air may escape from said chamber, passages are provided leading from the chamber to the exterior of the piston. These passages are designated 19 and extend through the wall of the conical portion 11 of the head 10, and open on the exterior of said conical portion above the head of the packing 5.

The passage 16 fits the stem 15 loose enough to permit air to enter along the stem into the chamber between the heads. The sliding movement of the head 10 outward on the stem 15 is limited by a pin 20.

In operation motive fluid under pressure as compressed air, steam and the like is admitted into the cylinder. It first actuates the head 10 to move the head 10 toward the head 1 against the action of the spring 17, thus causing the conical portion 11 to expand the packing 5 into snug engagement with the cylinder wall, this movement being against the action of the spring 17. Any air in the space between the heads is free to pass out first between the conical surfaces of the portion 11 and the packing 5, and thereafter out through the holes 19. Also any air that passes the head 10 into the chamber 18, passes out through the holes 19. It will be understood that when the pressure of compressed air or steam is applied to the head 10, it will be applied unequally to opposite sides of the head 10, and predominately on the upper side thereof so that the head 10 will move toward the head 1 and expand the packing 5.

In order that grease may be supplied to the cylinder, the stem 3 is formed hollow and is provided with a fitting 21 containing a valve through which the grease or oil may be forced into the stem of the piston 3, thence into the space between the heads at end 10, and thence to the cylinder wall. This feature, however, forms no part of this invention. As the motive fluid is let into the cylinder 12, the head 10 is first moved toward the head 1, and expands the packing 5 into snug engagement with the cylinder wall so that there is no leakage past the piston head, during the retrograde or return movement of the piston when the pressure is discontinued on the head 10. The spring 17 separates the heads, and relieves the expansive force on the packing 5, so that the piston can move in a retrograde direction with minimum friction and wear on the packing.

What I claim is:—

The combination with a cylinder, a piston movable in the cylinder comprising a head formed with a cup-shaped packing for engaging the cylinder wall, a second head arranged on the pressure side of the first head and movable toward and from the first head and having a packing engaging the cylinder wall, the second head also having a conical portion for entering the cup-shaped portion and expanding the same against the wall of the cylinder, the piston also having a stem projecting in advance of the first head and the second head being slidable on the stem, the second head being formed with a recess formed on its inner face opposed to the first head, said recess and the packing forming a chamber between the heads, the second head having passages leading from the recess therein and opening through the conical face above the edge of the packing and a spring interposed between the heads.

In testimony whereof, I have hereunto signed my name, at Syracuse, in the county of Onondaga, and in the State of New York, this 12th day of March, 1927.

ERNEST DAVIS.